United States Patent [19]

Neigebauer

[11] Patent Number: 5,445,016
[45] Date of Patent: Aug. 29, 1995

[54] TORQUE CONVERTER CLUTCH SOLENOID FUNCTIONAL TEST

[75] Inventor: James J. Neigebauer, Milford, Mich.
[73] Assignee: Ford Motor Company, Dearborn, Mich.
[21] Appl. No.: 257,315
[22] Filed: Jun. 10, 1994
[51] Int. Cl.⁶ .................................................. G01M 19/00
[52] U.S. Cl. ................................. 73/118.1; 364/424.1
[58] Field of Search ............... 73/118.1, 162, 49.7, 73/116, 862.31; 364/431.03

[56] References Cited
U.S. PATENT DOCUMENTS

| | | | |
|---|---|---|---|
| 4,386,521 | 6/1983 | Hamada et al. | 73/118.1 |
| 5,027,647 | 7/1991 | Shimanaka | 73/118.1 |
| 5,174,137 | 12/1992 | Kato et al. | 73/118.1 |
| 5,323,320 | 6/1994 | Hathaway et al. | 364/424.1 |

FOREIGN PATENT DOCUMENTS

| | | | |
|---|---|---|---|
| 52-22201 | 2/1977 | Japan | 73/118.1 |
| 377045 | 4/1991 | Japan | 73/118.1 |

Primary Examiner—Richard E. Chilcot, Jr.
Assistant Examiner—James M. Olsen
Attorney, Agent, or Firm—Roger L. May; Frank G. McKenzie

[57] ABSTRACT

A method and system for a torque converter clutch solenoid functional test which discriminates between electronic component failures from other subsystem failures, such as mechanical or hydraulic failures utilizing a plurality of counters for monitoring the state of the solenoid (34) and other subsystem components.

6 Claims, 5 Drawing Sheets

TORQUE CONVERTER CLUTCH SOLENOID FUNCTIONAL TEST

TECHNICAL FIELD

The present invention relates to a functionality test for a vehicular torque converter clutch solenoid.

BACKGROUND ART

Torque converters couple the engine to the transmission and operate to transfer engine torque to the transmission, which in turn transfers torque to the wheels. More specifically, the torque converter, which includes a clutch, operates to increase torque while reducing engine speed. Torque converters provide well-known advantages due to the infinitely variable conversion of speed and torque. Operation, or application, of the torque converter clutch is typically controlled by a solenoid.

The California Air Resources Board On-Board Diagnostics, more commonly known simply as OBD-II, is a set of regulations which prescribe certain standards relating to vehicular emissions. Currently, these regulations require that if the torque converter clutch is inadvertently applied as a result of a purely electronic component failure, then the MIL must be illuminated.

Existing strategies for testing the torque converter clutch control system only perform electrical "presence" tests. However, according to the OBD-II requirements, a purely electrical "presence" test of the torque converter clutch control system is not sufficient to eliminate the electronics as a contributor.

It would be desirable, therefore, to devise a torque converter clutch functional test which distinguishes between OBD-II electronic component (e.g. solenoids) failures and other, non-OBD-II subsystem failures (e.g. mechanical, hydraulic, and the like). Although a failed torque converter clutch solenoid (an electronic component failure) and a stuck bypass clutch control valve (a mechanical failure) could both cause the torque converter to lockup when a lockup has not been requested by the powertrain control module, only the former requires illumination of the MIL under the regulations.

SUMMARY OF THE INVENTION

It is, therefore, an object of the present invention to provide an improved torque converter clutch solenoid functional test.

It is a further object of the present invention to provide a torque converter clutch solenoid functional test which distinguishes between electronic component failures and other subsystem failures, such as mechanical and hydraulic failures.

In carrying out the above objects and other objects and features of the present invention, a method is provided for testing the functionality of a torque converter clutch solenoid. The method is for use with a vehicle having an electronic control unit and a driveline system including an engine, a transmission, and a torque converter operating to transfer engine torque to the transmission, the driveline system also including a torque converter clutch and a bypass clutch for controlling operation of the torque converter, and a solenoid for use with the torque converter clutch. The method comprises determining the gear state of the transmission, and determining the apply state of the torque converter clutch. The method also comprises determining the functional state of the torque converter clutch solenoid based on the gear state and the apply state of the torque converter clutch.

The advantages accruing to the method and system of the present invention are numerous. For example, the torque converter clutch solenoid functional test methodology of the present invention distinguishes between electronic component failures and other subsystem failures.

The above objects and other objects and features of the invention will be readily appreciated by one of ordinary skill in the art from the following detailed description of the best mode for carrying out the invention when taken in connection with the following drawings.

BEST MODE FOR CARRYING OUT THE INVENTION

Figure 1:
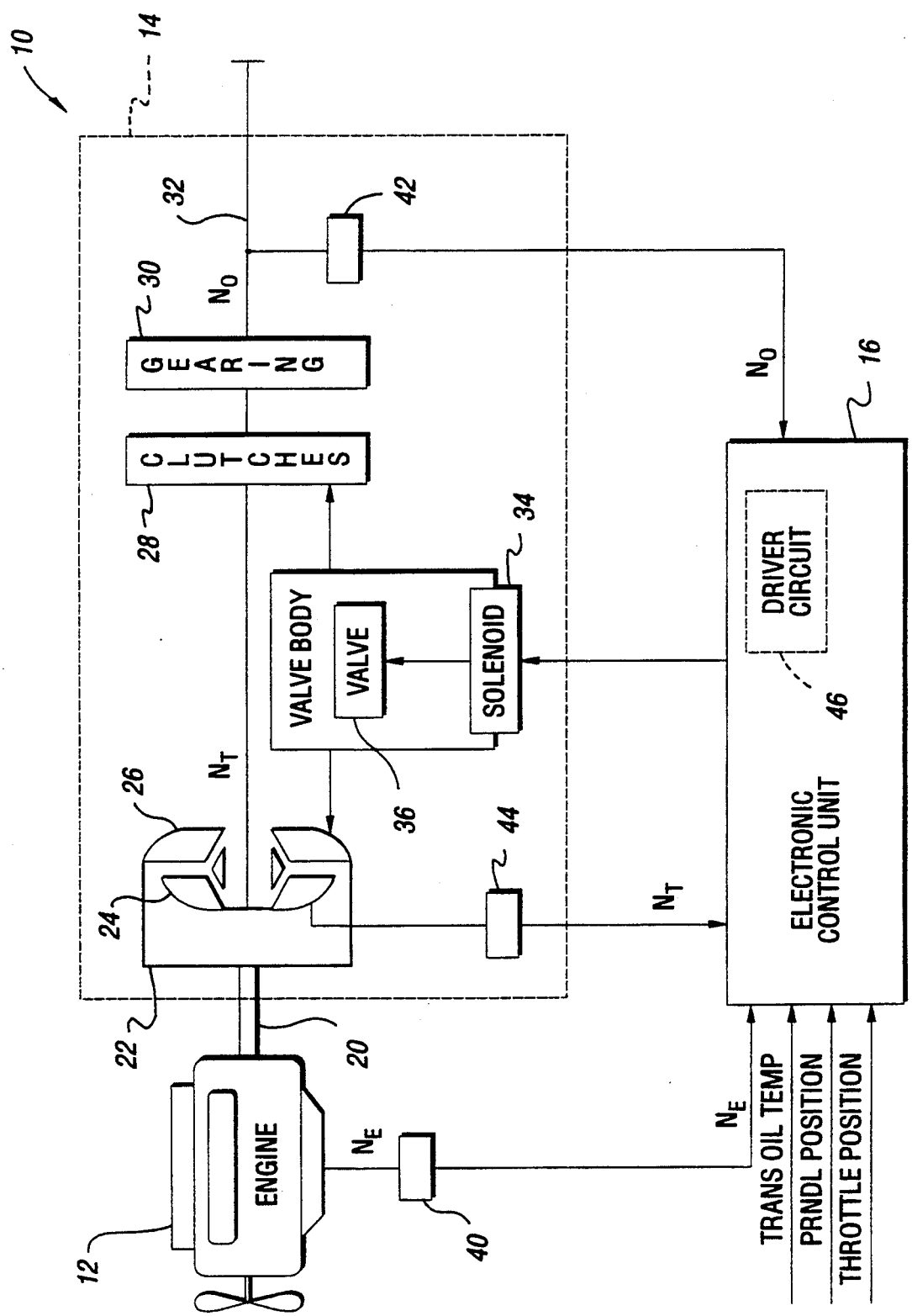
FIG. 1 is a block diagram of a system for use with the present invention.

Referring now to FIG. 1, there is shown a block diagram of a system 10 for use with the present invention. As illustrated, the system includes an internal combustion engine 12, a transmission 14 and an electronic control unit (ECU) 16. The transmission 14 transmits the torque generated by the engine through the transmission to drive axles not specifically illustrated. The torque flow originates at the engine output shaft 20 and flows through a torque converter 22, at least one clutch shown generally by reference numeral 28, and gearing shown generally by reference numeral 30, to the transmission output shaft 32, which is mechanically coupled to the drive axle.

It should be appreciated that the ECU 16 includes a microprocessor and memory, such as RAM and ROM memories, not specifically illustrated for the sake of clarity. It should be understood that in the preferred embodiment, this control unit 16 is a powertrain control module which cooperates with other control units for performing vehicle control, although the control unit 16 could, of course, be a master vehicle control unit.

With continuing reference to FIG. 1, the impeller 26 of the torque converter 22 is rotatably driven by the output shaft 20. The turbine 24 of the torque converter is rotatably driven by the impeller 26 by means of a known fluid transfer between the turbine and the impeller. In turn, the turbine 24 rotatably drives the transmission input shaft. Each clutch 28 is a fluid-operated, load-carrying friction element which can be applied or released according to a transmission operating strategy for establishing different ratios of the gearing 30 and for establishing torque flow paths through the gearing.

In the preferred embodiment, the ECU 16 executes the strategy based on a plurality of operating parameters, such as transmission oil temperature, shift lever position and throttle position, to name a few. Sensors, such as speed sensors 40, 42, and 44 provide engine speed ($N_E$), transmission output shaft ($N_O$) and turbine speed ($N_T$) information, respectively, to the ECU 16. The ECU utilizes these vehicle operating parameters to determine a control signal which is utilized by standard driver circuitry 46 to obtain an electric current for energizing a torque converter clutch (TCC) solenoid shown generally by reference numeral 34. The solenoid could be, for example, a variable force solenoid (VFS) energized according to a percent (%) current control signal, or a pulse-width modulated solenoid energized according to a duty cycle control signal. The TCC solenoid 34 controls a bypass clutch control (BCC) valve 36 which is utilized to apply the torque converter clutch 27.

Figure 2:
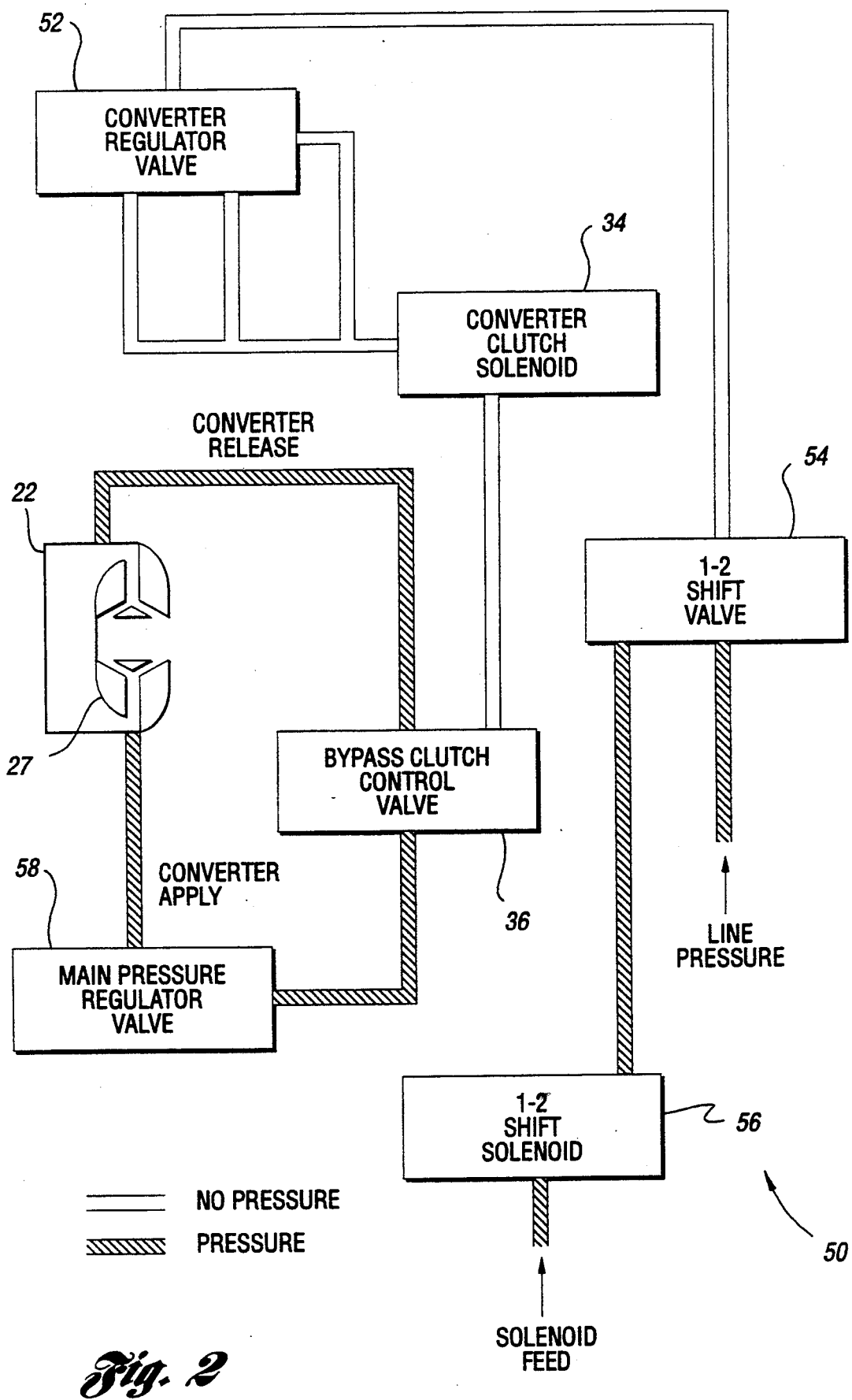
FIG. 2 is a torque converter clutch hydraulic apply circuit for use with the present invention.

Referring now to FIG. 2, there is shown a torque converter clutch apply circuit, shown generally by reference numeral 50, for use with the system shown in FIG. 1. In the preferred embodiment, the torque converter clutch solenoid functional test utilizes the hydraulic design of the apply circuit 50. As shown, the apply circuit 50 includes a converter regulator valve 52 in fluid communication with the TCC solenoid 34 (FIG. 1) and a 1-2 shift valve 54. The 1-2 shift valve 54 receives hydraulic fluid at line pressure, and also from a normally open 1-2 shift solenoid 56.

With continuing reference to FIG. 2, the TCC solenoid 34 is in fluid communication with the BCC valve 36, which in turn is in fluid communication with the torque converter 22 and a main pressure regulator valve 58. The TCC solenoid 34 controls the position of the bypass clutch control valve. In $1^{st}$ gear, no pressure is supplied to the converter regulator valve 52 and solenoid 34 via the 1-2 shift valve 54. As such, even if the converter solenoid is energized, no hydraulic fluid is provided to the bypass clutch control valve 36 and hence no lockup is possible. The BCC valve, in its normal $1^{st}$ gear state, allows pressure to be fed to the release side of the torque converter 22, keeping the converter unlocked in $1^{st}$. If the BCC valve 36 is stuck in the wrong position, however, release pressure is cut-off and the converter clutch 27 will apply (apply pressure is always fed to the converter).

Thus, the application of the converter clutch 27 is hydraulically inhibited while the transmission 14 is in first gear, by use of the BCC valve 36. If the transmission 14 is functioning properly, the torque converter clutch cannot be applied in first gear, even if a 100% duty cycle is output to the solenoid 34.

More specifically, the test logic continuously monitors the state of the torque converter clutch 27. If the converter clutch is applied in first gear, then a hydraulic malfunction (e.g. bypass clutch control valve stuck on) exists. Similarly, if the converter clutch is applied in every forward gear, then the bypass clutch control valve 36 is in an incorrect position (e.g. stuck on), and the state of the TCC solenoid 34 can not accurately be determined. If the converter clutch is not applied in first gear, but is applied in all remaining gears, then the solenoid 34 may be the cause. Thus, if the converter clutch is applied in a gear other than first, the cause could be either a hydraulic malfunction, or a malfunctioning torque converter clutch solenoid. The present invention can distinguish between these types of faults.

Figure 3A:
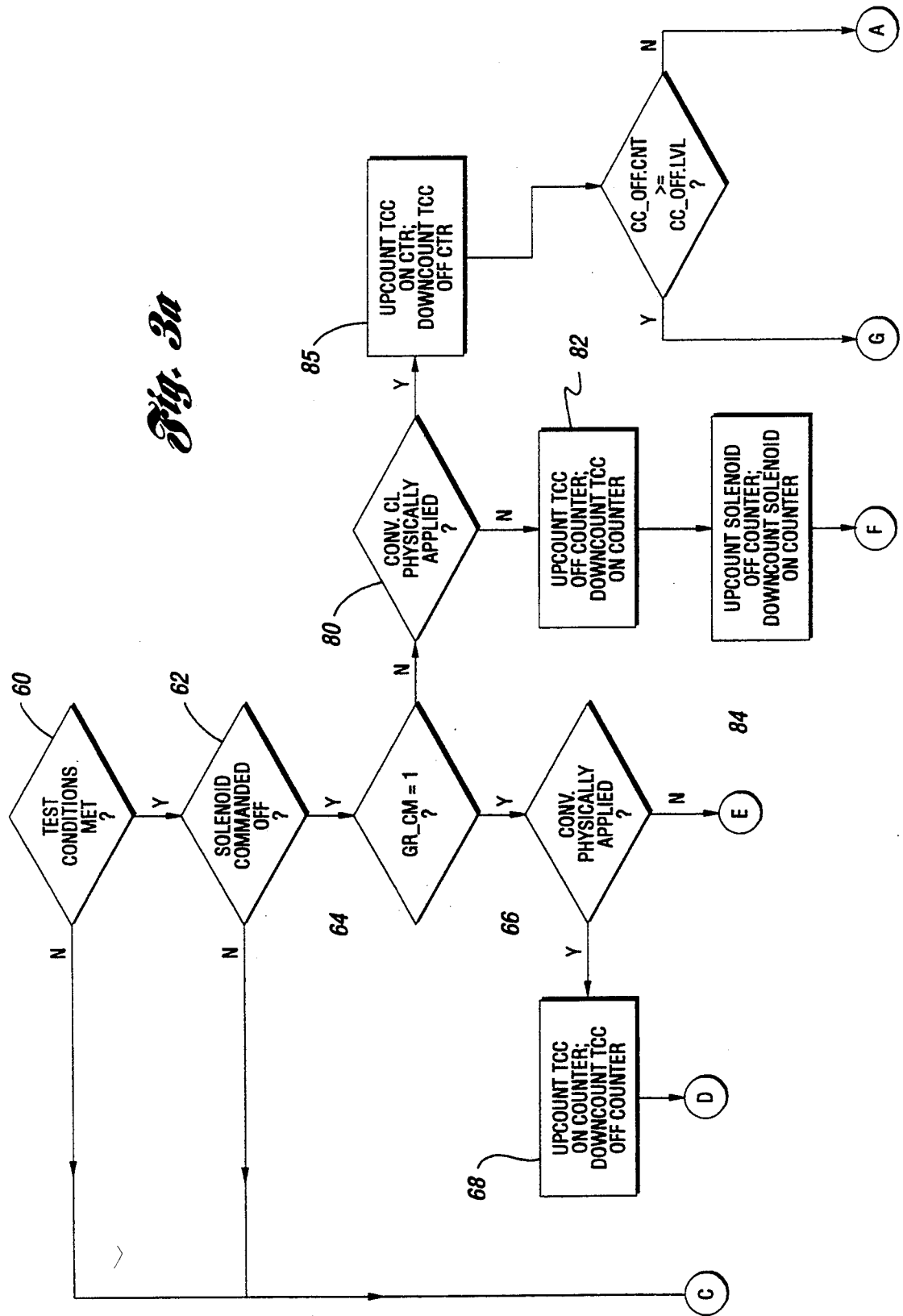
FIGS. 3a-3c is a flowchart detailing the torque converter clutch solenoid functional test of the present invention.
Figure 3B:
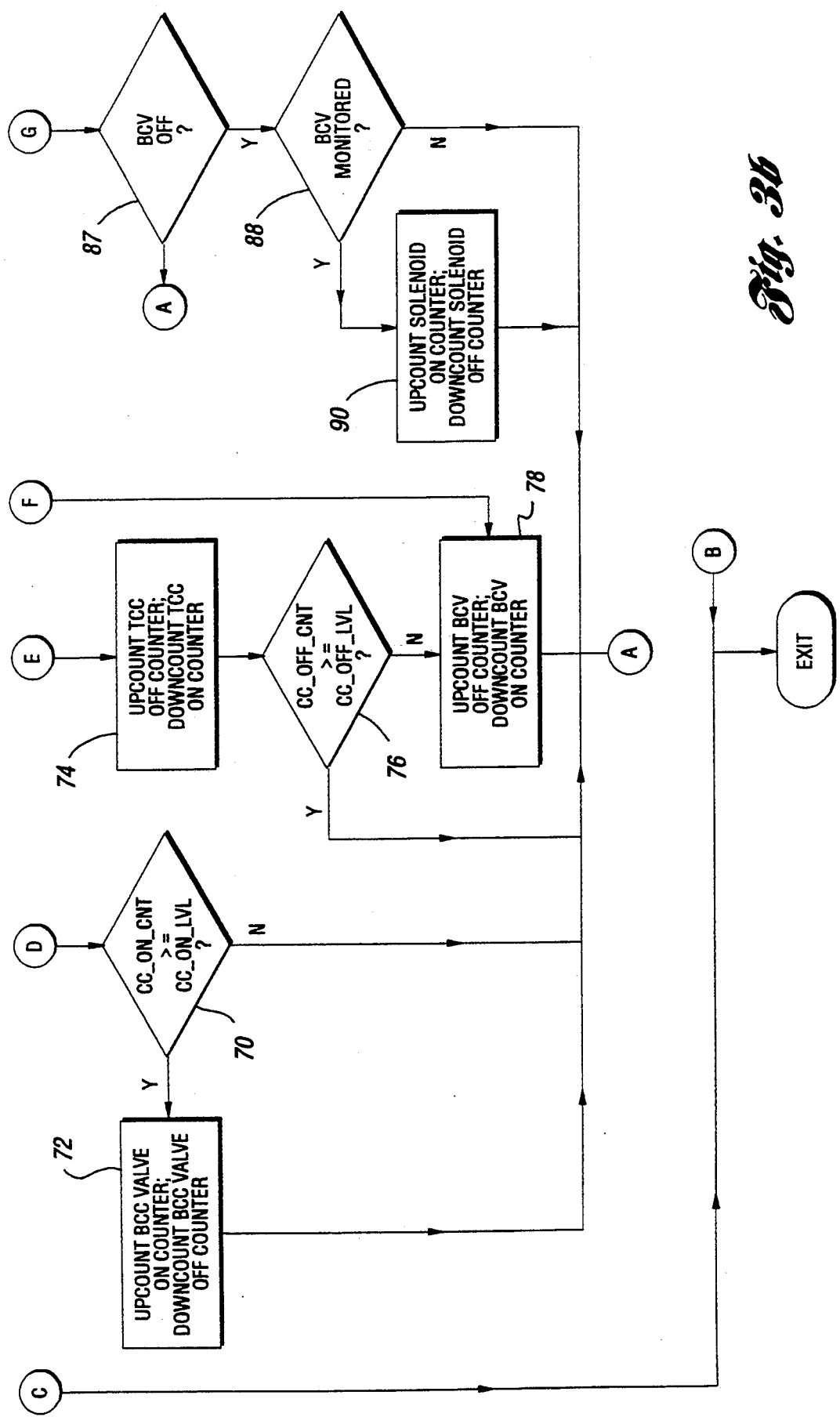
Figure 3C:
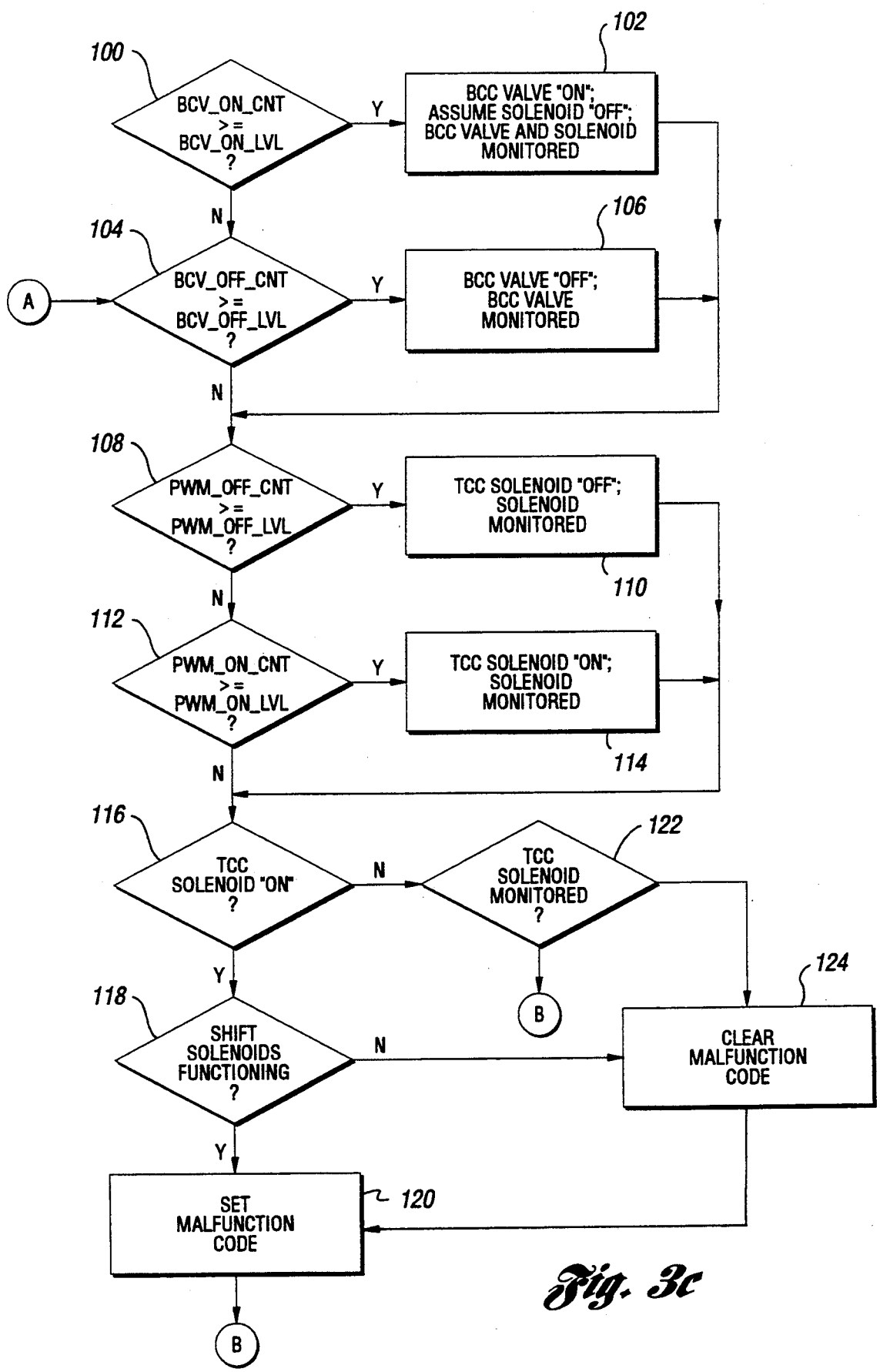

Referring now to FIGS. 3a–3c, there is shown a flowchart detailing the torque converter clutch solenoid functional test according to the present invention. Generally, the test logic determines if the TCC solenoid is mechanically "on", although commanded "off" (i.e. duty cycle output by the electronic control unit to the TCC solenoid is zero).

If the duty cycle to the TCC solenoid is non-zero, then the ECU is requesting the TCC to be applied, and the functional test logic described is disabled. As noted above, the TCC functional test logic takes advantage of the hydraulic design of the transmission.

The functional test logic continuously monitors the apply state of the converter clutch. "On" counters and "off" counters are used to verify the apply state. When the value of one of the counters exceeds a calibratable threshold, the apply state of the converter clutch is verified. Both counters are zeroed and not allowed to update for a calibratable time through the use of a delay timer if a transient disturbance in the driveline is detected, so as to increase the accuracy of the test results.

Determination of the apply state of the TCC is accomplished by comparing the actual torque converter clutch slip with a calculated open converter clutch slip value, as described in greater detail below. If the TCC is applied in 1st gear, the BCC valve is then determined to be stuck in an "on" position. The strategy implements "on" and "off" counters which are used to verify the position of the valve—one is incremented if the converter clutch is applied in $1^{st}$ gear while the other counter is decremented. The reverse happens if the TCC is not applied in $1^{st}$ gear. If the one BCC valve counter exceeds a calibratable threshold, then the BCC valve is verified as stuck in the "on" position, whereas if the other BCC valve counter exceeds a calibratable threshold, the BCC valve is determined to be in its correct position for $1^{st}$ gear, and is assumed to be functioning properly. In the preferred embodiment, the counters are only allowed to update once when $1^{st}$ gear is commanded. It follows that unless $1^{st}$ gear is commanded a calibratable amount of times, the counters will be unable to reach a threshold.

Once the position of the BCC valve is determined, this information is then used to determine the functional state of the TCC solenoid. In the preferred embodiment, no determination is made regarding the mechanical state of the TCC solenoid until the state of the BCC valve has been verified. If the BCC valve is determined to be stuck in the "on" position, the converter clutch will always be applied, regardless of the state of the TCC solenoid. Thus, the test logic is preferably disabled until the next ECU power-up.

If the BCC valve was verified to be in its correct position in $1^{st}$ gear (i.e. "off"), and the TCC is applied in a forward gear other than $1^{st}$ when no ECU duty cycle is commanded to the TCC solenoid, then the TCC solenoid is said to be mechanically failed "on". Again, counters are preferably used to verify the TCC mechanical state. If the TCC is applied under these conditions, a counter is incremented. The reverse happens if the TCC is not applied under these conditions. When the value of one of the counters exceeds a calibratable threshold, the apply state of the converter clutch is verified. In the preferred embodiment, the counters are only allowed to update once when a zero TCC solenoid state is reached. Thus, unless a zero duty cycle is commanded a calibratable amount of times, the counters will be unable to exceed a threshold. If the TCC is determined to be mechanically failed "on", an appropriate malfunction code is set.

As shown in FIG. 3a, at step 60, the ECU 16 determines whether or not the torque converter clutch solenoid functional test entry conditions have been met. In the preferred embodiment, the functional test is disabled unless the transmission output shaft speed is above a speed threshold, and unless the speed ratio across the torque converter is within a pair of speed ratio thresholds. Similarly, the test may be disabled if the transmission oil temperature or the relative throttle position are not within specified limits, or if the change in throttle requested is unacceptable. The transmission oil temperature is also monitored at start up, and the functional test is preferably disabled if the arithmetic average of earlier measurements is unacceptable. Additionally, the test is preferably disabled if the net torque into the torque converter is not within specified limits, or if the change in net torque into the torque converter exceeds a limit.

With continuing reference to FIG. 3a, if the entry conditions are not satisfied, the functional test is disabled and the associated software module is exited. If, however, the test entry conditions are satisfied, control flow proceeds to step 62, wherein the ECU 16 determines whether the TCC solenoid has been commanded "off". If the solenoid has been commanded "off", the duty cycle output by the ECU to the solenoid 34 should be zero, and the test proceeds; otherwise the test is disabled as shown. At step 64, the ECU checks the state of a transmission gear register, the value of which indicates whether or not the transmission is in $1^{st}$ gear. If the transmission is in $1^{st}$ gear, the value of the register is set to "1". The register is a RAM register which can take on values of "1", "2", "3", or "4", corresponding to $1^{st}$, $2^{nd}$, $3^{rd}$ and $4^{th}$ gear, respectively. If the transmission is in $1^{st}$ gear, control flow proceeds to step 66.

As best shown in FIG. 3a, at step 66 the ECU determines whether the torque converter clutch is physically applied. The applied state of the torque converter clutch is preferably determined by comparing the measured torque converter clutch slip (SLIP_ACT) with an open converter clutch slip value (SLIP_OPEN) that has been calculated utilizing a torque converter clutch model which predicts the open converter slip under current operating conditions. In the preferred embodiment, SLIP_OPEN is determined as follows:

$$SLIP_{OPEN} = \frac{TRQ_{INPUT}}{(C * NT_F)}$$

wherein $TRQ_{INPUT}$ is the filtered input torque to the transmission, C is a torque converter constant relating torque and turbine speed and $NT_F$ is the filtered turbine speed.

The torque converter clutch is considered to be physically applied if either SLIP_ACT is less than SLIP_OPEN by a calibratable amount, or if SLIP_ACT is less than a calibratable threshold. Thus, in the preferred embodiment:

$$SLIP\_ACT = NE_F - NT_F$$

$$SLIP\_DIF = SLIP\_OPEN - SLIP\_ACT$$

$$SLIP\_DIF \geq SLP\_CC\_ON$$

$$SLIP\_ACT \leq SLIP\_ACT\_LK$$

wherein $NE_F$ is the filtered engine speed, $NT_F$ is the filtered turbine speed, SLIP_DIF is the difference between a calculated open converter slip and the actual slip, SLP_CC_ON is a slip difference threshold above which the torque converter is considered to be applied, and SLIP_ACT_LK is the threshold of slip below which the torque converter is locked (i.e. applied). It should be noted that the ECU 16 also determines whether the normal open slip (SLIP_OPEN) value is large enough to ensure an accurate test result through a comparison to a slip minimum.

With continuing reference to FIG. 3a, if the transmission is in $1^{st}$ gear (step 64) and the torque converter clutch is physically applied (step 66), then a hydraulic fault is determined to exist—the bypass clutch control valve is deemed to be stuck "on". Accordingly, the ECU 16 increments a TCC "on" counter (and decrements a TCC "off" counter) at step 68. At step 70, the ECU 16 determines whether the TCC "on" counter exceeds or is equal to a threshold (CC_ON_LVL). If the condition is true, the BCC valve 37 on" counter is incremented and the BCC valve "off" counter is decremented at step 72.

If the transmission is in $1^{st}$ gear but the torque converter clutch is not physically applied (step 66), the ECU 16 increments the TCC "off" counter and decrements the TCC "on" counter at step 74. Control flow then proceeds to step 76, wherein the value of the TCC "off" counter is compared to CC_OFF_LVL, which represents the threshold for determining if the TCC is not applied. If the value of the counter exceeds the threshold, the TCC is deemed to be "off". At step 78, the bypass clutch control valve "off" counter is incremented, and the bypass clutch control valve "on" counter is decremented.

As shown in FIG. 3a, if the test at step 64 fails (i.e. the transmission is not in $1^{st}$ gear), at step 80 the ECU 16 determines whether the torque converter clutch is physically applied. If not, the TCC "off" counter is incremented and the TCC "on" counter is decremented at step 82. Control flow proceeds to steps 84 and from there to step 78, wherein the solenoid "off" and BCC valve "off" counters are likewise incremented, and the solenoid "on" and BCC valve "on" counter are decremented.

If the torque converter clutch was determined to be applied at step 80, control flow proceeds to step 85, wherein the TCC "on" counter is incremented and the TCC "off" counter is decremented. A flag would be set at step 70, previously described, and then stored in a RAM register, which would be addressed following completion of step 85. If the flag is set, indicating that CC_ON_CNT>=CC_ON_LVL, as seen at 86, the routine proceeds to step 87. If the flag is not set at that time, the routine proceeds to point A in FIG. 3c. At step 87 the ECU 16 determines, such as by checking the state of an associated flag, whether or not the bypass clutch control valve is off. If so, at step 88, the ECU 16 determines whether or not the bypass clutch control valve has been monitored, i.e. whether the state of the bypass clutch control valve has been verified, such as by checking the state of an associated flag. If the step at 88 is satisfied, at step 90 the ECU increments the solenoid "on" counter and decrements the solenoid "off" counter. Thus, if the transmission is not in first gear, the torque converter clutch is applied, and the bypass clutch control valve has been monitored and is "off", then the solenoid counters are modified.

Referring now to FIG. 3c, the value of the bypass clutch control valve "on" and "off" counters are compared to their respective thresholds at steps 100 and 102. If the "on" counter exceeds or equals the threshold, the BCC valve is verified as stuck in the "on" position, and the torque converter clutch solenoid is assumed as being in the "off" position at step 102. Additionally at step 102, the BCC valve and the TCC solenoid are deemed to have been monitored, such as by the setting of an appropriate flag. Step 104 is omitted, and control flow skips to step 108.

If, however, the BCC valve "off" counter exceeds or equals the "off" threshold, the valve is in its correct position for first gear, and is assumed to be functioning properly. Accordingly, at step 106, the ECU sets appropriate flags to indicate the BCC valve is "off" and monitored.

With continuing reference to FIG. 3c, the TCC solenoid "on" and "off" counters are compared with their respective thresholds at steps 108 and 112. If the solenoid "off" counter exceeds or equals its threshold, at step 110 the state of the TCC solenoid is verified as being "off" and monitored. Similarly, if the solenoid "on" counter exceeds or equals its threshold, at step 114 the state of the TCC solenoid is verified as being failed "on" and monitored. In the preferred embodiment, a TCC flag is toggled to a "1" if the solenoid is failed "on".

As shown, at step 116 the ECU determines whether or not TCC solenoid is failed "on", such as by checking the state of the appropriate flag. If the solenoid is failed "on", and all shift solenoids are functional (step 118), then an appropriate malfunction code flag is set at step 120 indicating the TCC solenoid failure. If the TCC solenoid is not failed "on" and the solenoid has been monitored (step 122), or if the solenoid is failed "on" and at least one other shift solenoid is not functional (step 118), then the appropriate malfunction code flag is cleared at step 124.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

I claim:

1. For use with a vehicle having an electronic control unit and a driveline system including an engine, a transmission, and a torque converter operating to transfer engine torque to the transmission, the driveline system also including a torque converter clutch and a bypass clutch system for controlling operation of the torque converter clutch, and a solenoid for use with the torque converter clutch, a method for testing the functionality of the torque converter clutch solenoid comprising:

determining the gear state of the transmission;
   determining the apply state of the torque converter clutch;
   determining the operational state of the bypass clutch system based on the gear state and the apply state of the torque converter clutch;
   modifying a plurality of counters associated with the torque converter clutch solenoid based at least on the gear state and the apply state of the torque converter clutch;
   comparing the value of the plurality of torque converter clutch solenoid counters to a like plurality of associated thresholds; and
   determining the functional state of the torque converter clutch solenoid based on the comparison.

2. The method of claim 1 wherein the transmission has a plurality of forward gear ratios, and determining the gear state of the transmission comprises determining whether the transmission is in a gear ratio corresponding to first gear.

3. The method of claim 1 wherein the apply state of the torque converter clutch is determined based on an actual torque converter clutch slip and a calculated open torque converter clutch slip.

4. The method of claim 3 wherein the torque converter clutch is determined to be applied if the absolute difference between the actual torque converter clutch slip and the calculated open torque converter clutch slip exceeds a limit.

5. The method of claim 3 wherein the torque converter clutch is determined to be applied if the actual torque converter clutch slip is below a threshold.

6. The method of claim 3 wherein the actual torque converter clutch slip is determined according to:

$$SLIP\_ACT = NE_F - NT_F$$

* * * * *